July 25, 1950     H. R. HUMPHREYS     2,516,388
PUMP

Original Filed Dec. 20, 1946     3 Sheets-Sheet 1

Inventor
Hanna R. Humphreys,
By Stone, Boyden & Mack,
Attorneys

July 25, 1950 H. R. HUMPHREYS 2,516,388
PUMP
Original Filed Dec. 20, 1946 3 Sheets-Sheet 2
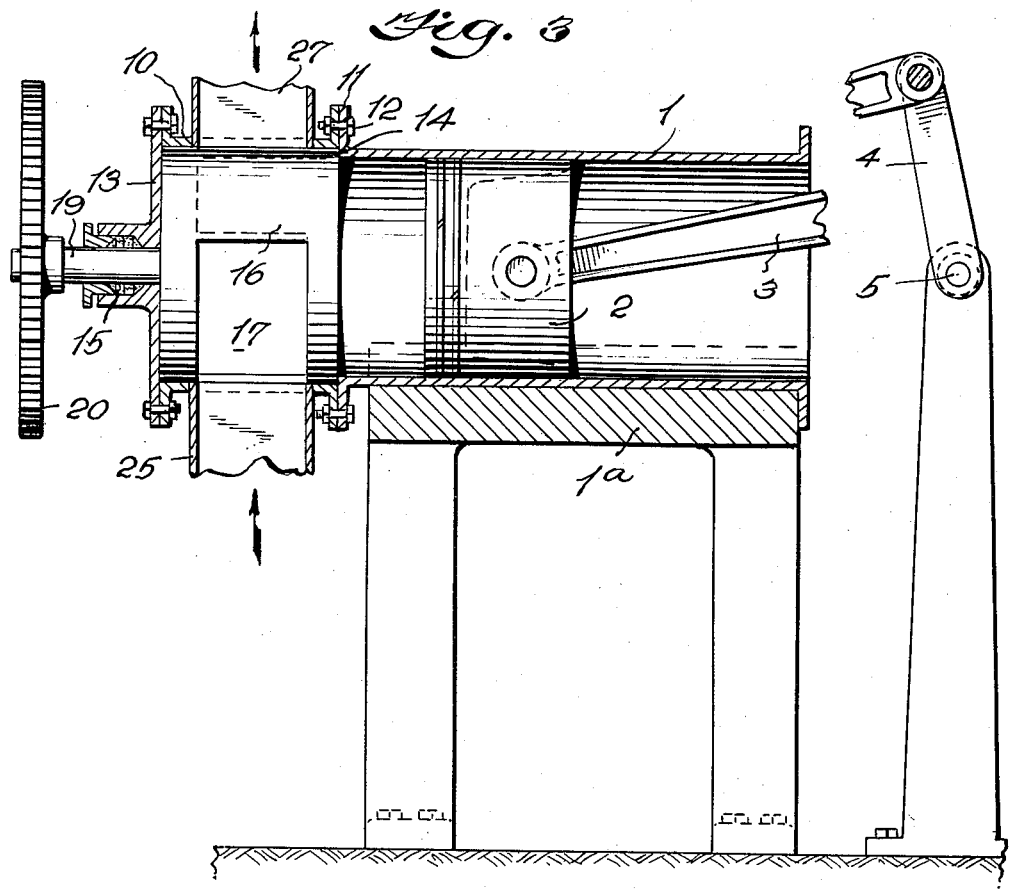
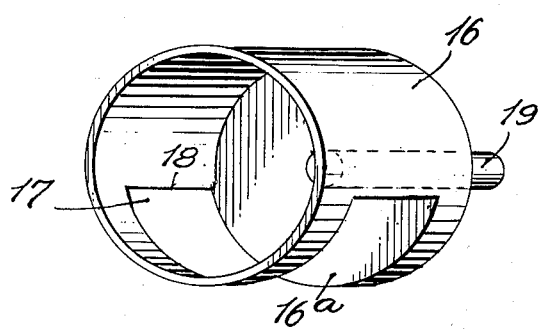
Inventor
Hanna R. Humphreys,
By Stone, Boyden & Mack,
Attorneys.

INVENTOR.
Hanna R. Humphreys,
BY
Stone, Boyden & Mack,
Attorneys.

Patented July 25, 1950

2,516,388

UNITED STATES PATENT OFFICE 2,516,388

PUMP

Hanna R. Humphreys, Weems, Va., assignor to The Humphreys Railways, Inc., Weems, Va., a corporation of Virginia Original application December 20, 1946, Serial No. 717,555. Divided and this application January 5, 1949, Serial No. 69,361

2 Claims. (Cl. 103—227)

This invention relates to apparatus for handling bulk materials, and more particularly for unloading fish from the hold of a boat or other receptacle containing a mass of fish mixed with water.

The unloading of boat loads of fish and the delivery of these fish to a packing house or other factory, has always presented a difficult problem. This unloading and handling of the fish has heretofore been done entirely by hand and is a very tedious and laborious operation.

One of the objects of the present invention is to devise a method and apparatus for unloading and conveying boat loads of fish by means of a pump.

Another object of the invention is to devise an improved construction of pump capable of efficiently moving a fluid mass consisting of a mixture of fish and water, and so designed that only an extremely small percentage of the fish passing through the pump is injured or damaged.

The present application is a continuation in part of my prior co-pending application S. N. 604,445, filed July 11, 1945, now abandoned, and also contains subject matter divided out of my prior co-pending application S. N. 717,555, filed December 20, 1946.

In order that the invention may be readily understood, reference is had to the accompanying drawings forming part of this specification, and in which:

Fig. 3 is a vertical longitudinal section through the pump taken substantially on the line 3—3 of Fig. 1, looking in the direction of the arrows, parts being shown in elevation and parts being broken away;

Fig. 4 is a perspective view of my improved rotary valve forming part of the pump;

Figure 1:
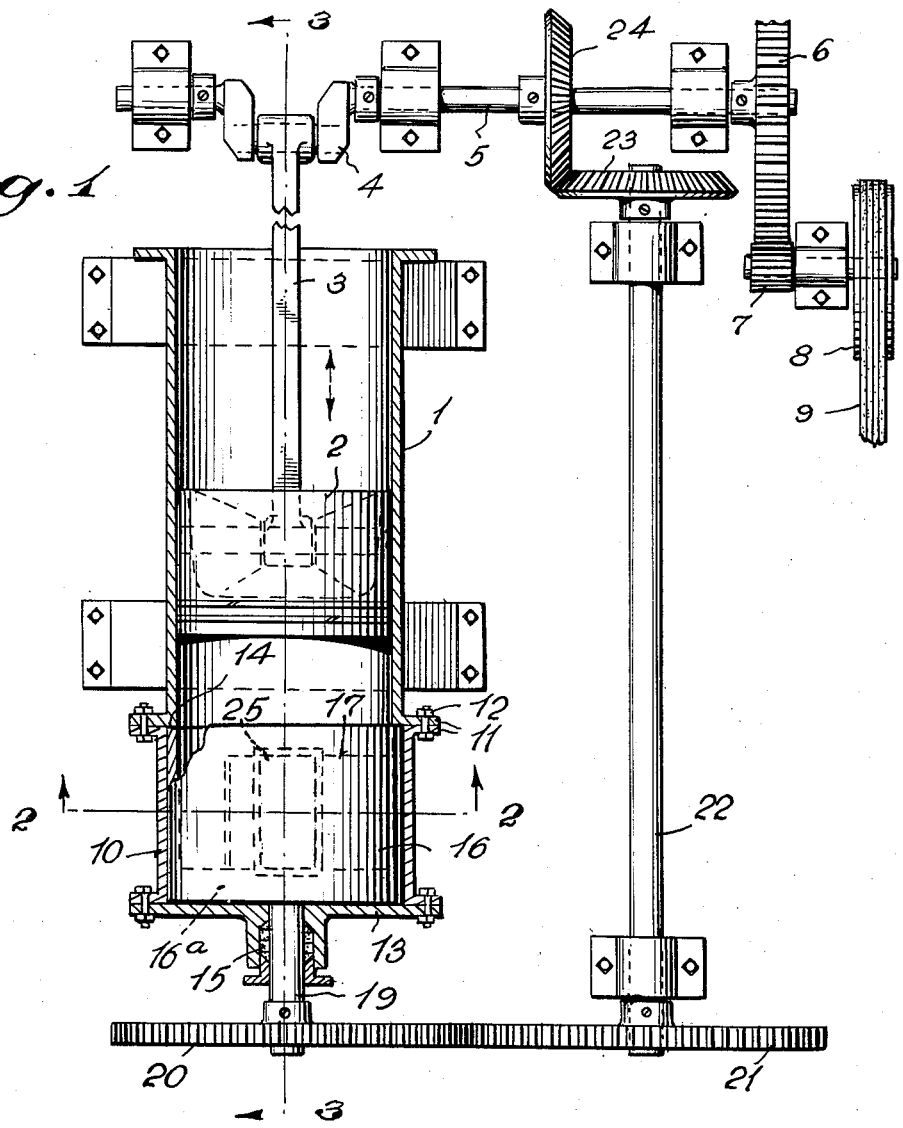
Fig. 1 is a longitudinal section through my improved pump and associated mechanism, parts being shown in elevation.
Figure 2:
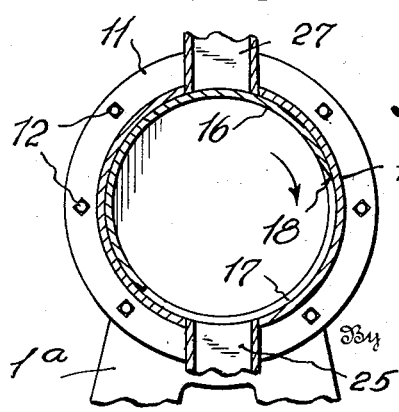
Fig. 2 is a transverse section substantially on the line 2—2 of Fig. 1, looking in the direction of the arrows.

Referring to the drawings in detail, my improved pump is of the single acting reciprocating type and comprises a cylinder 1, open at one end, and mounted on a suitable support 1ª. In this cylinder reciprocates a solid piston 2, coupled by means of a connecting rod 3, to the crank 4 of a crankshaft 5, journalled in suitable bearings and having secured thereto a gear 6, meshing with a pinion 7, connected with a pulley 8, around which passes a belt 9 from an engine or other suitable source of power, by which the pump is driven.

At the end of the cylinder 1, opposite its open end, is a valve housing or casing 10. This is disposed co-axially of the cylinder, and constitutes, in effect, an extension thereof. The valve casing is secured to the cylinder by means of abutting flanges 11, fastened together by bolts 12. A head 13, similarly secured, closes the outer end of the valve casing 10.

It will be noted that the casing 10 is of slightly greater internal diameter than the cylinder 1, thus forming an annular shoulder 14 at the joint between the cylinder and casing. This shoulder is for the purpose of maintaining in position a rotary valve 16, which is contained in and fits snugly within the casing 10.

This valve is best shown in Fig. 4, and is in the form of a hollow cylindrical member, having one open end communicating with the interior of the cylinder 1, and closed at its other end by a head 16ª, in the center of which is mounted a shaft 19. The valve 16 has a port 17 cut in the cylindrical wall thereof, and extending a substantial distance circumferentially thereof. As shown in the drawings, it extends almost half way around the valve.

As clearly shown in Fig. 4, the two side edges of this port 17 extend axially and one of them, as shown at 18, is sharpened by bevelling off to provide a knife edge.

The head 13 carries a stuffing box 15, through which the shaft 19 extends, and to the outer end of this shaft 19 is secured a gear 20. This meshes with a similar gear 21, secured to a shaft 22, mounted in suitable bearings and carrying at its other end a bevel gear 23, meshing with a similar gear 24 on the crankshaft 5.

Thus, as the piston 2 reciprocates, the valve 16 is rotated in synchronism therewith or in definite timed relation thereto.

Projecting radially from the cylindrical valve casing 10 are intake and discharge conduits 25 and 27, these being shown as located at diametrically opposite points of the casing.

A suitable suction hose (not shown) is attached to the intake conduit 25, and is inserted down into the hold of a boat or other receptacle containing the fish, to which sufficient water has been added to form a fluid mass capable of being pumped.

It will be understood that during the outward or suction stroke of the piston 2, the port 17 is in such a position that the end of the conduit 25 entering the valve casing 10 is open, and therefore the mixture of fish and water can enter the valve and cylinder through the conduit 25 and port 17. As or just before the piston begins its return or delivery stroke, the port 17 reaches such position as to uncover the end of the discharge conduit 27, while at the same time the valve 16 covers or closes the end of the intake conduit 25. Thus, as the piston moves inwardly, it forces the fish and water mixture contained in the cylinder out through the port 17 and discharge conduit 27.

By virtue of the fact that the valve 16 is hollow, it provides a chamber within which any fish which were not discharged may be temporarily held as the piston approaches the innermost limit of its stroke, thus preventing the fish from being mashed by the piston.

If, by any chance, a fish should be caught within the mouth of the intake or discharge conduit, as the valve closes, the sharp knife edge 18 of the valve, cooperating with the edge of the conduit, will cut or shear the fish off, and thus prevent clogging or jamming of the apparatus. While I thus provide a knife edge for shearing off a fish which may possibly become caught in the port as the valve closes, I have found, from experience, that, in practice, this happens very seldom. Tests have shown that less than one percent of the fish are in any way cut or injured.

While, for the sake of simplicity, I have illustrated and described a pump consisting of but a single cylinder, it will, of course, be understood that I contemplate using a plurality of cylinders, each with its own rotary valve, if desired, and all discharging into a common conduit.

Figure 5:
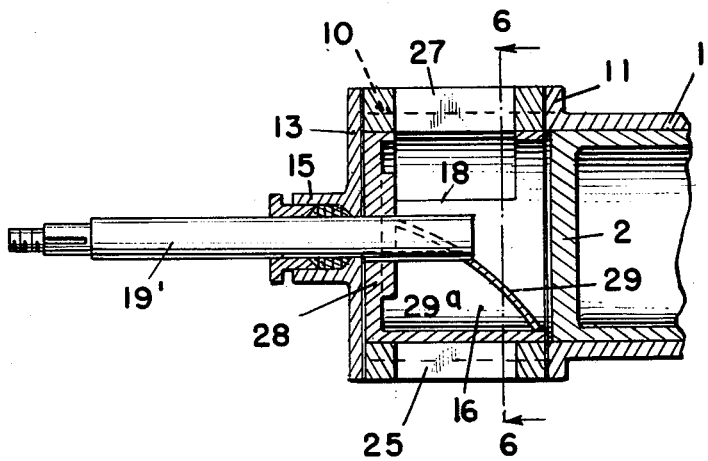
Fig. 5 is a fragmentary, longitudinal, vertical section, somewhat similar to Fig. 3, but showing a modified construction of valve.
Figure 6:
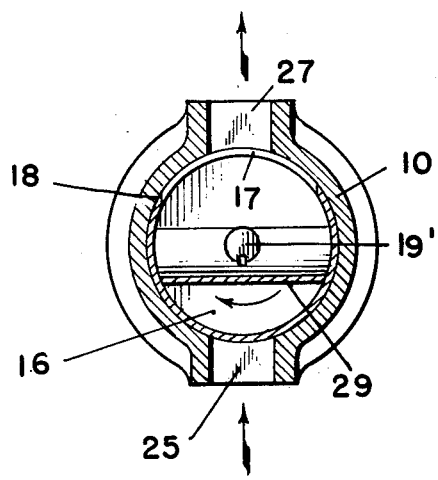
Fig. 6 is a transverse section substantially on the line 6—6 of Fig. 5, looking in the direction of the arrows.

The valve shown in Figs. 5 and 6 is similar in construction and operation to that illustrated in the preceding figures. In using the valve shown in Figs. 1 to 4, however, it has been found that there is a slight tendency for fish to become trapped in the hollow interior of the cylindrical valve. In order to avoid this, and to eliminate any possible pocket in which the fish might become caught or jammed, I have devised the construction shown in Figs. 5 and 6. In this arrangement I provide a partition wall or baffle plate 29 extending from the open end of the cylindrical valve member at a point opposite the port 17 diagonally toward the axis thereof. Opposite its open end the valve member comprises an end plate 28 keyed to a shaft 19' which preferably projects into the interior of the valve member. The partition wall 29 extends to and around the projecting end of this shaft as indicated at 29ᵃ in Fig. 5, and is preferably welded thereto and to the inner walls of the valve member, thus closing off the space within said valve member opposite the port 17. Thus the fish passing through the port 17 into and out of the pump cylinder, slide freely over this diagonal partition wall 29 and all possibility of their becoming trapped or jammed is eliminated.

While I have described the invention in connection with the unloading of fish, it will be understood that it is also applicable to the handling of other material. Where, therefore, in the claims, I use the expression "fish," I wish it to be understood that I intend to include other solid material of substantially the same specific gravity as water, in the form of pieces or fragments capable of mixing with water in all proportions.

What I claim is:

1. A reciprocating pump for handling a mixture of water and fish, said pump comprising a cylinder and piston, a valve casing at one end of said cylinder and co-axial therewith, said valve casing forming a continuation of said cylinder and having inlet and discharge conduits extending radially therefrom, a rotary valve in said casing, said valve being in the form of a hollow cylindrical member, open at its end adjacent said cylinder, and having a port controlling the flow of fluid into and out of said cylinder through said intake and discharge conduits, said port having axially extending edges, one of said edges being bevelled off and sharpened to form a knife edge, said knife edge cooperating with the inside edge of the mouth of one of said conduits to produce a shearing action capable of slicing through any fish which may be caught in said port and means for rotating said valve in synchronism with said piston.

2. A reciprocating pump comprising a cylinder and piston, a valve casing at one end of said cylinder and co-axial therewith, said valve casing forming a continuation of said cylinder and having inlet and discharge conduits extending radially therefrom, a rotary valve in said casing, said valve being in the form of a hollow completely cylindrical member, open at its end adjacent said cylinder, and having at its other end a wall formed with a flat face bearing against the end wall of said casing, said valve having at one side a port controlling the flow of fluid into and out of said cylinder through said intake and discharge conduits, a partition plate inside of said hollow cylindrical member and extending diagonally from a point adjacent the edge of said open end to said end wall at a point adjacent the ends of said port, thus closing off a portion of the interior of said hollow member opposite said port, and means for rotating said valve in synchronism with said piston.

HANNA R. HUMPHREYS.

REFERENCES CITED

The following references are of record in the file of this patent:

UNITED STATES PATENTS

| Number | Name | Date |
|---|---|---|
| 630,977 | Emgarth | Aug. 15, 1899 |
| 1,037,378 | Ward | Sept. 13, 1912 |
| 1,236,944 | Kirby | Aug. 14, 1917 |
| 1,937,803 | Bagby | Dec. 5, 1933 |

FOREIGN PATENTS

| Number | Country | Date |
|---|---|---|
| 421,497 | Great Britain | 1934 |
| 777,425 | France | 1935 |